United States Patent [19]

Brand et al.

[11] 3,867,410

[45] Feb. 18, 1975

[54] CLEANING OF THE LOWER FINNED TUBES IN THE SEPARATION OF PHTHALIC ANHYDRIDE

[75] Inventors: Erich Brand, Braunsfeld; Helmut Saffran, Cologne, both of Germany

[73] Assignee: Chemiebau Dr. A. zieren GmbH & Co. kg., Braunsfeld, Germany

[22] Filed: Apr. 5, 1971

[21] Appl. No.: 131,371

[30] Foreign Application Priority Data

Apr. 6, 1970   Germany............................ 2016302

[52] U.S. Cl................ 260/346.4, 260/246.7, 134/5, 134/30, 165/61
[51] Int. Cl............................................ C07c 63/18
[58] Field of Search...................... 260/346.7, 346 U

[56] References Cited
UNITED STATES PATENTS 2,440,873   5/1948   Douns............................. 260/346.4
2,676,186   4/1954   Frank.............................. 260/346.7
3,024,251   3/1962   Feder............................. 260/346.8

Primary Examiner—Henry R. Jiles
Assistant Examiner—Bernard I. Dentz
Attorney, Agent, or Firm—Mileen, Raptes & White

[57] ABSTRACT

For cleaning the lower rows of finned tubes in a separator used for precipitating phthalic anhydride from reaction gases containing same, there is provided a system wherein crude molten phthalic anhydride from the collecting tank is periodically pumped up through the bottom of the separator to form a pool of liquid covering the lower rows. The liquid is withdrawn from a side aperture above the lower tubes and below the upper tubes. In this manner, a current of molten phthalic anhydride rapidly solubilizes the difficult to remove, firmly adhering deposits.

8 Claims, 3 Drawing Figures

ERICH BRAND
HELMUT SAFFRAN
inventors

CLEANING OF THE LOWER FINNED TUBES IN THE SEPARATION OF PHTHALIC ANHYDRIDE

BACKGROUND OF THE INVENTION

This invention relates to a process and apparatus for the separation of phthalic anhydride from gases containing same, and in particular, to a system wherein said gases are passed through a nest of cooled finned tubes disposed one above the other, and the thus precipitated phthalic anhydride is melted off by heating the tubes.

The preparation of phthalic anhydride is conventionally conducted by the gas phase oxidation of o-xylene or naphthalene with air in contact with $V_2O_5$ catalysts. The phthalic anhydride is then precipitated from the reaction gases in separators, these separators being provided with heat transfer surface, usually tubes, which can be periodically cooled and heated, respectively, for the deposition and the removal, by melting, of the thus-precipitated phthalic anhydride. These separators conventionally contain many rows of tubes which are surrounded by the flowing reaction gases during the precipitation phase. In the continuous operation of these separators, it has been found that firmly adhering, high melting impurities gradually cover the pipes. These deposits, in contrast to the phthalic anhydride, cannot be removed by melting at conventional heating medium temperatures. Thus, in due time, these hard-melting deposits build up to the point where the operation must be interrupted so that fouled heat exchange tubes can be cleaned. Such interruptions are undesirable, of course, since, on the one hand, a stand-by separator must be kept on hand, and the cleansing of the separator is laborious.

The place in the separator where the deposits of impurities first adhere is dependent, to a large degree, on the nature of the aromatic starting material. Thus, impurities are either deposited first on the tubes disposed on the gas inlet side of the separator or on the tubes on the gas outlet side of the separator.

SUMMARY OF THE INVENTION

Bearing in mind the above-stated fouling problem, the principal object of this invention is to provide a process and apparatus for the separation of phthalic anhydride from gases containing the same while decreasing the frequency of or eliminating the occurrences of the above-mentioned operational disturbances due to the formation of firmly adhering, high melting deposits on heat exchange tubes.

Upon further study of the specification and appended claims, other objects and advantages of the present invention will become apparent.

To attain the above objects, there is provided an improved system comprising flushing the lower finned tubes of the tube nest during a melting-off period with externally added molten crude phthalic anhydride.

When based on the oxidation of o-xylene, the downwardly flowing reaction gas is cooled to such an extent that maleic anhydride and water present in said gas are deposited on the lower finned tubes. During the melting-off step, due to the effect of heat, fumaric acid is formed from these deposits and can only be melted off with difficulties at the conventional heating medium temperatures. The phthalic anhydride precipitated on the lower tubes during a separating step generally does not exhibit a sufficiently high dissolving power during the melting period to remove the fumaric acid completely. For this reason, these tubes in the lower portion of the separator are flushed on the side of the pipes where the precipitation occurs, with crude phthalic anhydride which dissolves the hard-to-melt deposits and removes the latter from the pipes.

As for phthalic anhydride produced by naphthalene oxidation, the gas is allowed to flow upwardly through the nest of finned tubes since the polymeric impurities therein exhibit a lower volatility than phthalic anhydride and are rapidly deposited on the lower rows of finned tubes.

The nest of finned tubes in the separator usually comprises about 6 to 12, preferably 8 to 10 horizontal rows of tubes, and by the "lower tubes" in the context of this invention is meant the lowermost 2 to 6, preferably the lowermost 3 to 5 rows.

DETAILED DISCUSSION OF THE INVENTION

The phthalic anhydride melt is preferably circulated by a pump through the lower portion of the separator. Thus, the pipes are surrounded by flowing phthalic anhydride which dissolves the hard-to-melt deposits. Advantageously, the phthalic anhydride melt utilized for the flushing procedure has a temperature of 130°–220° C., especially 130°–175° C.

The treatment with added crude phthalic anhydride according to this invention may not be required in each melting-off cycle. Depending on the content of the critical impurities in the reaction gas, the treatment with the added phthalic anhydride melt according to this invention can be conducted after several, e.g., 20 to 300 melting-off periods while still preventing a buildup of impurities. However, the time intervals and the quantity of impurities removed by dissolution according to this invention should preferably not be so large that the charge laden with these impurities cannot be rectified to the required degree of purity by means of an existing rectification unit. Therefore, it is generally advantageous to utilize a relatively frequent removal of the difficult-to-melt deposits, e.g., once every 20 to 50 cycles. In this way a crude phthalic anhydride is obtained which does not exhibit too great a variation in the concentration of the thus-removed impurities during the course of the production.

Preferred apparatus for the periodic separation and melting of phthalic anhydride comprises a housing with one opening in the upper portion and lower portion for the feeding and discharging of the gases containing the phthalic anhydride, and with finned tubes disposed in the gas path between these openings. These tubes are surrounded by the flowing gases and can be filled with either a heating medium or a cooling medium.

The apparatus further comprises a first aperture in the bottom of the housing for the discharge of the liquid phthalic anhydride, and is especially characterized, according to this invention, in that a second discharge aperture for liquid phthalic anhydride is arranged in the housing wall above the lowermost finned tubes, and that one of the discharge apertures can be connected to the pressure side of a pump conveying crude phthalic anhydride. For flushing purposes, the liquid phthalic anhydride can be pumped into the housing through the first aperture provided for the discharge of the melted-off phthalic anhydride. The level of liquid phthalic anhydride rises within the housing up to the second discharge aperture provided in accordance with this invention, and then is discharged from the housing through this aperture. The height of the second discharge aperture thus determines the height of the level of the phthalic anhydride during the flushing procedure. Suitably, the second discharge aperture is arranged on the sidewall of the housing opposite to the first discharge aperture so that, during the flushing step, a current is produced through the phthalic anhydride sump thereby increasing the dissolving effect on the immersed separating tubes. In principle, the flushing medium can also be fed through the second aperture disposed above the tubes to be immersed, and can be withdrawn through the first aperture disposed at the lowermost point of the separator; however, in general, the reverse flow direction will be preferred.

The second discharge aperture and the suction side of the pump are preferably in communication, by conduits, with a container for crude phthalic anhydride. This container can be the conventional collecting tank for the phthalic anhydride melted off in the separators. Due to the circulatory pumping of the curde phthalic anhydride from the collecting tank through the bottom portion of the separator, the thus-removed impurities are uniformly distributed in the crude product. A phthalic anhydride with such uniformly distributed impurities is also advantageous for the subsequent thermal pretreatment and rectification and makes it possible to obtain a product having a uniform degree of purity. The second discharge aperture is preferably sealable by a shut-off element such as a valve so that it is also possible to fill the separator completely with phthalic anhydride when the second discharge aperture is sealed off. The last mentioned technique might become necessary from time to time for the additional cleaning of the higher-positioned rows of tubes.

In accordance with a particularly preferred embodiment of the invention, provision is made to shape the lowermost separator tubes in a hairpin form, and to dispose these tubes all around the gas opening in the lower portion of the housing. The gases flowing through the separator in the downward direction toward the gas discharge opening in the lower portion of the housing must pass through the interspaces between the lowermost separator tubes, since the latter shield the gas exit opening on all sides. This prevents short-circuiting of the gas, and ensures a sufficient separating effect, thereby diminishing the possibility of the gas leaving the separator with an undesirably high residual content of phthalic anhydride. It is also advantageous to provide that the lowermost tubes can be heated independently of the remaining tubes. This makes it possible to heat these tubes, which are covered with phthalic anhydride containing maleic acid, more rapidly than the other tubes of the separator, and thus to reduce the amount of fumaric acid formed from maleic acid by rearrangement.

DETAILED DESCRIPTION OF ILLUSTRATED EMBODIMENTS

Figure 1:
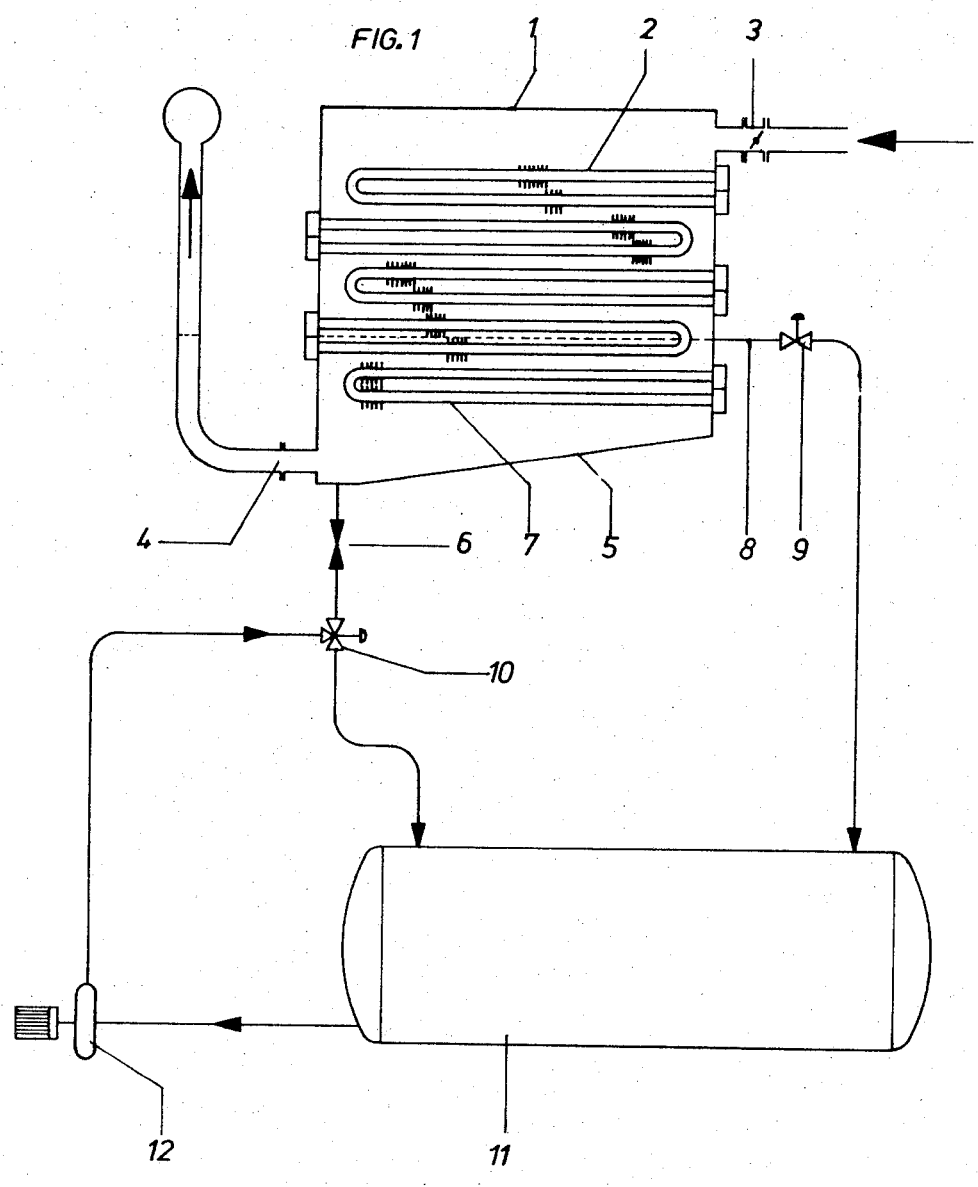
FIG. 1 is a schematic illustration of a separator having a flushing unit connected thereto.

According to FIG. 1, a large number of horizontally super-imposed rows of hairpin-shaped finned tubes 2 are disposed in the separator 1. The separator housing 1 has a gas inlet nipple 3 at the top, and at the bottom on the opposite side, a gas outlet nipple 4. The housing has an inclined bottom 5 having an angle with the horizontal of about 1° to 5°. At the lowermost point of this bottom, a discharge drain 6 is provided for the melted-off phthalic anhydride. At a level immediately above the lowermost finned tubes 7, i.e., those subject to deposits, a second drain pipe 8 is provided for liquid phthalic anhydride, which drain pipe can be sealed off by a valve 9. The tubes 2, 7 can be fed with a cooling or heating medium in order to separate and melt the phthalic anhydride. The tubes 7 can be heated independently of the tubes 2, to achieve rapid heating. The discharge drain 6 is in communication, via a three-way valve 10, with a collecting tank 11 for crude phthalic anhydride so that the phthalic anhydride melted off in the separator 1 can be discharged into the tank 11. The collecting tank 11 is, moreover, connected to the three-way valve 10 also via a pump 12, and the second drain pipe 8 of the housing is likewise in communication with the collecting tank 11 via the valve 9.

The gas withdrawn from the oxidation reactor enters, after passing a gas cooler (not illustrated), at a temperature of 145° – 200° C., preferably 165° – 175° C., through the nipple 3 into the separator 1. The charge of phthalic anhydride in the reaction gas is about 37 – 42 g./Nm$^3$ at the inlet of the separator. The gas flows downwardly in the separator around the finned tubes 2, is cooled during this process, and deposits phthalic anhydride on the tubes 2 and 7, which tubes are cooled by a cooling medium of 45° – 55° C. The gas leaves the separator 1 via the outlet nipple 4 at a temperature of 55° – 65° C.

After the gas feed is stopped, the resultant loaded separator is subjected to a melting-off step by placing the finned tubes 2, 7 under the effect of a heating medium at a temperature of between 145° and 190° C. With the nipple 6 closed by the three-way valve 10, the thus-molten phthalic anhydride is collected in the bottom portion of the separator 1. In order to keep the tubes 7 clear of impurities the valves 9 and 10 are opened during the melting-off step, and crude phthalic anhydride from the collecting container 11 is pumped, by the pump 12, through the discharge nipple 6 into the bottom portion of the separator 1. The phthalic anhydride exits again through the drain pipe 8 and flows back into the collecting container 11. By this flushing procedure, non-meltable deposits on the finned tubes 7 are dissolved, below the phthalic anhydride level indicated in dashed lines, and removed. Toward the end of the melting-off phase, this flushing process is interrupted by closing the valve 9 and changing the three-way valve 10 to draining. The liquid phthalic anhydride present in the separator 1 then is completely discharged into the container 11. After closing the three-way valve 10, the separating period is recommenced, i.e., the tubes 2, 7 are charged with a cooling medium, and the valve at the gas inlet nipple 3 is opened for incoming gas.

Figure 2:
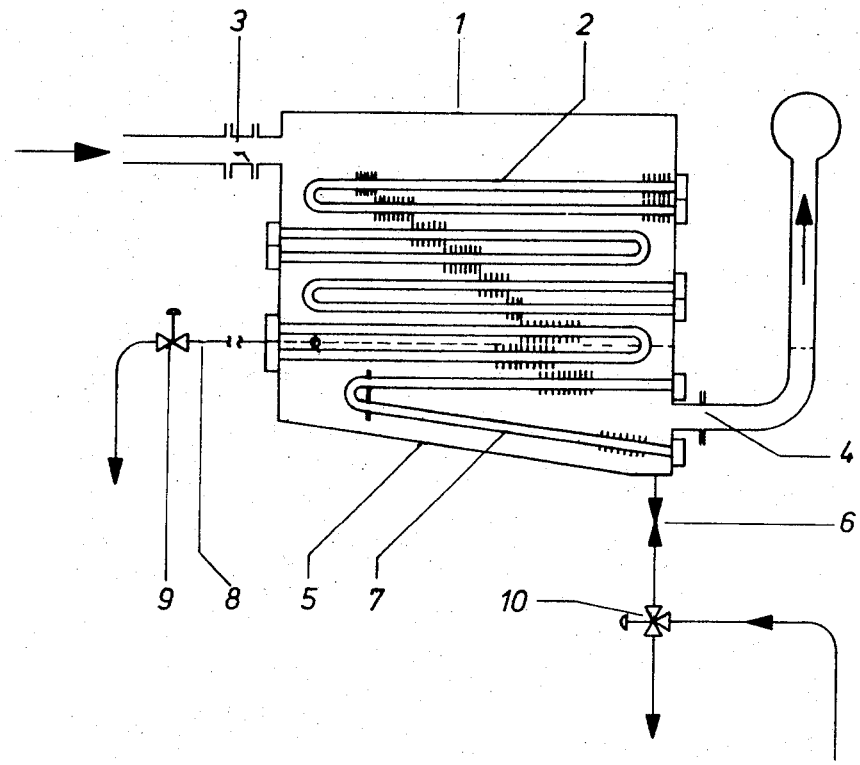
FIG. 2 is a side schematic view of a separator having an especially designed lower tube bundle.
Figure 3:
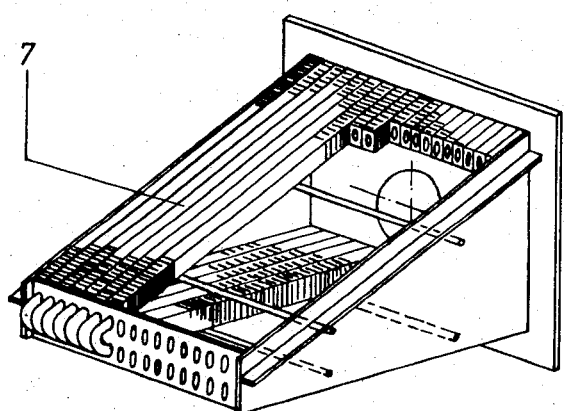
FIG. 3 is a perspective view illustrating the lower tube bundle of the separator of FIG. 2.

The separator illustrated in FIG. 2 differs from that of FIG. 1 in that the gas outlet pipe 4 is surrounded on all sides by a bundle of hairpin-shaped finned tubes 7 having an apex angle of about 1° to 5°. In this design, the gas is forced to flow between the finned tubes 7. Thereby, there is avoided the formation of short circuit gas flow paths which would otherwise result in a lower separation efficiency of the entire separator. FIG. 3 shows the lower system of tube bundles which can be pulled out in its entirety from the separator 1 of FIG. 2.

The flow rate of the phthalic anhydride across the lower fin-tubes during the flushing period is between 0.002 and 0.02 m/sec or even higher if a corresponding efficient pump 12 is installed.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE

Phthalic anhydride is separated in an installation as shown in FIG. 1 with a separator containing 10 horizontal tube rows. After each 20 cycles molten crude phthalic anhydride was pumped during one melting-off period of 1 hour around the lowermost 3 separator tube rows. Each cycle comprises a separation period of 6 hours, a melting-off period of 1 hour and a cooling period of 1 hour. The content of impurities of the crude phthalic anhydride used for flushing is increased only by 0.1 percent.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a cyclical process for recovering solid phthalic anhydride in a separator from a gas containing phthalic anhydride vapor obtained by catalytic air oxidation of o-xylene or naphthalene in contact with a $V_2O_5$ containing catalyst, comprising continuously repeating in sequence the steps of: (a) passing said gas containing phthalic anhydride vapor over a plurality of rows of cooled heat exchange tubes superimposed on one another in a housing to precipitate solid phthalic anhydride on the surfaces thereof; (b) passing a hot fluid having a temperature of about 145°–190°C through said heat exchange tubes to heat the surfaces thereof to at least 130°C and melt off resultant precipitated phthalic anhydride; (c) flushing said heat exchange tube surfaces towards the end of at least one step (b) with externally added molten phthalic anhydride having a temperature of 130°–280°C, whereby there is substantially prevented a buildup in difficult-to-remove, firmly adhering deposits of impurities which otherwise would cause a shut-down in the process; (d) collecting resultant molten phthalic anhydride from said heat exchange tube surfaces; and (e) cooling said heat exchange tube surfaces by passing a fluid having a temperature of about 45°–55°C therethrough;

the improvement comprising: forming a pool of molten phthalic anhydride in the bottom of said housing below said heat exchange tubes and flushing said heat exchange surfaces with molten phthalic anhydride from said pool at a point above the lower rows of tubes.

2. A process as defined by claim 1 wherein said molten phthalic anhydride is withdrawn at a point just above the lower rows of heat exchange tubes.

3. A process as defined by claim 1 wherein said heating and cooling steps (b) and (d) are effected by the cyclical delivery of heating and cooling fluids respectively through said heat exchange tubes.

4. A process as defined by claim 1 further comprising discharging said gas from step (a) so as to prevent short-circuiting of gas in said housing.

5. A process as defined by claim 4 wherein said gas is discharged through an aperture formed in said housing and enveloped by a finned heat exchange tube.

6. A process as defined by claim 3 wherein said lower rows of tubes are heated independently of the remaining heat exchange tubes.

7. A process as defined by claim 1 wherein said gas is obtained from the air oxidation of o-xylene and is directed downwardly onto said heat exchange tubes.

8. A process as defined by claim 1 wherein said gas is obtained from the air oxidation of naphthalene and is directed upwardly onto said heat exchange tubes.

* * * * *